(12) United States Patent
Kerschbaum (10) Patent No.: US 10,833,841 B2
(45) Date of Patent: Nov. 10, 2020

(54) LEAKAGE-FREE ORDER-PRESERVING ENCRYPTION

(71) Applicant: SAP SE, Walldorf (DE)

(72) Inventor: Florian Kerschbaum, Frankfurt (DE)

(73) Assignee: SAP SE, Walldorf (DE)

( * ) Notice: Subject to any disclaimer, the term of this patent is extended or adjusted under 35 U.S.C. 154(b) by 327 days.

(21) Appl. No.: 15/209,003

(22) Filed: Jul. 13, 2016

(65) Prior Publication Data
US 2018/0019866 A1    Jan. 18, 2018

(51) Int. Cl.
| | |
|---|---|
| H04L 29/06 | (2006.01) |
| H04L 9/00 | (2006.01) |
| H04L 9/06 | (2006.01) |
| G06F 21/62 | (2013.01) |

(52) U.S. Cl.
CPC .......... H04L 9/002 (2013.01); G06F 21/6227 (2013.01); H04L 9/0618 (2013.01); H04L 2209/12 (2013.01); H04L 2209/30 (2013.01)

(58) Field of Classification Search
CPC ........................ H04L 2209/60; G06F 2211/007
See application file for complete search history.

(56) References Cited

U.S. PATENT DOCUMENTS

| | | | | |
|---|---|---|---|---|
| 2007/0110232 A1* | 5/2007 | Akiyama | .............. | H04L 9/3026 380/30 |
| 2007/0255941 A1* | 11/2007 | Ellis | ..................... | H04L 9/0662 713/151 |
| 2008/0005476 A1* | 1/2008 | Venkatesan | ......... | G06F 12/0802 711/118 |
| 2009/0300351 A1* | 12/2009 | Lei | ........................ | H04L 9/0894 713/165 |
| 2012/0151210 A1* | 6/2012 | Perez | ...................... | G06F 21/35 713/168 |

(Continued)

OTHER PUBLICATIONS

Agrawal, D., El Abbadi, A., Emekci, F., and Metwally, A. Database management as a service: challenges and opportunities. In Proceedings of the 25th International Conference on Data Engineering (2009), ICDE.

(Continued)

Primary Examiner — Jason K Gee
(74) Attorney, Agent, or Firm — Fountainhead Law Group P.C.

(57) ABSTRACT

Embodiments implement leakage-free order-preserving encryption by assigning a distinct ciphertext for each plaintext, including repeated plaintext whose ciphertext is randomly inserted. In order to conceal insertion order, the randomized ciphertexts are compressed to minimal ciphertext space. A uniform distribution is achieved by rotating about a modulus on the ciphertexts rather than the plaintexts. The resulting ciphertext distribution has no leakage from the ciphertexts—even if an adversary has perfect background knowledge on the distribution of plaintexts. The encryption may be further secured even against passive query monitoring attacks by hiding the access pattern using $\epsilon$, $\delta$-differential privacy, such that the adversary observing a sequence of queries will not learn the frequency of plaintext. The leakage-free order-preserving encryption may be converted into an adjustable encryption scheme to allow querying (e.g., on a remote server).

12 Claims, 6 Drawing Sheets

(56) References Cited

U.S. PATENT DOCUMENTS

| | | | | |
|---|---|---|---|---|
| 2012/0297201 | A1* | 11/2012 | Matsuda | G06F 21/6245 713/189 |
| 2013/0170640 | A1* | 7/2013 | Gentry | H04L 9/008 380/30 |

OTHER PUBLICATIONS

Agrawal, R., Kiernan, J., Srikant, R., and Xu, Y. Order preserving encryption for numeric data. In Proceedings of the ACM International Conference on Management of Data (2004), SIGMOD.

Boldyreva, A., Chenette, N., Lee, Y., and O'Neill, A. Order-preserving symmetric encryption. In Proceedings of the 28th International Conference on Advances in Cryptology (2009), EUROCRYPT.

Boldyreva, A., Chenette, N., and O'Neill, A. Order-preserving encryption revisited: improved security analysis and alternative solutions. In Proceedings of the 31st International Conference on Advances in Cryptology (2011), CRYPTO.

Boneh, D., Lewi, K, Raykova, M., Sahai, A., Zhandry, M., and Zimmerman, J. Semantically secure order-revealing encryption: multi-input functional encryption without obfuscation. In Proceedings of the 34th International Conference on Advances in Cryptology (2015), EUROCRYPT.

Boneh, D., Sahai, A., and Waters, B. Functional encryption: definitions and challenges. In Proceedings of the 8th Conference on Theory of Cryptography (2011), TCC.

Boneh, D., and Waters, B. Conjunctive, subset, and range queries on encrypted data. In Proceedings of the 4th Theory of Cryptography Conference (2007), TCC.

Bosch, C., Hertel, P., Jonker, W., and Peter, A. A survey of provably secure searchable encryption. ACM Computing Surveys 47, 2 (2014).

Cash, D., Grubbs, P., Perry, J., and Ristenpart, T. Leakage-abuse attacks against searchable encryption. In Proceedings of the 22nd ACM Conference on Computer and Communications Security (2015), CGS.

Cash, D., Jaeger, J., Jarecki, S., Jutla, C., Krawczyk, H., Rosu, M., and Steiner, M. Dynamic searchable encryption in very-large databases: Data structures and implementation. In Proceedings of the 21st Network and Distributed System Security Symposium (2014), NDSS.

Cash, D., Jarecki, S., Jutla, C., Krawczyk, H., Rosu, M.-C., and Steiner, M. Highly-scalable searchable symmetric encryption with support for boolean queries. In Proceedings of the 33rd Cryptology Conference (2013), CRYPTO.

Chenette, N., Lewi, K., Weis, S., and Wu, D. Practical order-revealing encryption with limited leakage. In Proceedings of the 23rd International Workshop on Fast Software Encryption (2016), FSE.

Curtmola, R., Garay, J., Kamara, S., and Ostrovsky, R. Searchable symmetric encryption: improved definitions and efficient constructions. Journal of Computer Security 19, 5 (2011).

Ducklin, P. Anatomy of a password disaster—adobe's giant-sized cryptographic blunder. https://nakedsecurity.sophos.com/2013/11/04/anatomy-of-a-password-disaster-adobes-giant-sized-cryptographic-blunder/, 2013.

Dwork, C. Differential privacy. In Proceedings of the 33rd International Colloquium on Automata, Languages and Programming (2006), ICALP.

Fitzpatrick, A. Apple says systems weren't hacked in nude pics grab. http://time.com/3257945/apple-icloud-brute-force-jennifer-lawrence/, 2014.

Garg, S., Mohassel, P., and Papamanthou, C. Tworam: efficient oblivious RAM in two rounds with applications to searchable encryption. In Proceedings of the 36rd Cryptology Conference (2016), CRYPTO.

Gentry, C. Fully homomorphic encryption using ideal lattices. In Proceedings of the Symposium on Theory of Computing (2009), STOC.

Goldreich, O., and Ostrovsky, R. Software protection and simulation on oblivious RAMs. Journal of the ACM 43, 3 (1996).

Goldwasser, S., Kalai, Y. T., Popa, R. A., Vaikuntanathan, V., and Zeldovich, N. Reusable garbled circuits and succincl functional encryption. In Proceedings of the Symposium on Theory of Computing (2013), STOC.

Hacigumus, H., Iyer, B. R., Li, C., and Mehrotra, S. Executing sql over encrypted data in the database-service-provider model. In Proceedings of the ACM International Conference on Management of Data (2002), SIGMOD.

Hahn, F., and Kerschbaum, F. Searchable encryption with secure and efficient updates. In Proceedings of the 21st ACM Conference on Computer and Communications Security (2014), CCS.

Hildenbrand, S., Kossmann, D., Sanamrad, T., Binnig, C., Farber, F., and Wohler, J. Query processing on encrypted data in the cloud. Tech. Rep. 735, Department of Computer Science, ETH Zurich, 2011.

Hore, B., Mehrotra, S., and Tsudik, G. A privacy-preserving index for range queries. In Proceedings of the 30th International Conference on Very Large Data Bases (2004), VLDB.

Hwang, Y. H., Kim, S., and Seo, J. W Fast order-preserving encryption from uniform distribution sampling. In Proceedings of the ACM Workshop on Cloud Computing Security Workshop (2015), CCSW.

Islam, M., Kuzu, M., and Kantarcioglu, M. Access pattern disclosure on searchable encryption: ramification, attack and mitigation. In Proceedings of the 19th Network and Distributed System Security Symposium (2012), NDSS.

Kadhem, H., Amagasa, T., and Kitagawa, H. My-opes: multivalued-order preserving encryption scheme: a novel scheme for encrypting integer value to many different values. IEICE Transactions on Information and Systems E93.D (2010), 2520{2533.

Kadhem, H., Amagasa, T., and Kitagawa, H. A. secure and efficient order preserving encryption scheme for relational databases. In Proceedings of the International Conference on Knowledge Management and Information Sharing (2010), KMIS.

Kamara, S., and Papamanthou, C. Parallel and dynamic searchable symmetric encryption. In Proceedings of the 17th International Conference on Financial Cryptography and Data Security (2013), FC.

Kamara, S., Papamanthou, C., and Roeder, T. Dynamic searchable symmetric encryption. In Proceedings of the 19th ACM Conference on Computer and Communications Security (2012), CCS.

Katz, J., Sahai, A., and Waters, B. Predicate encryption supporting disjunctions, polynomial equations, and inner products. In Advances in Cryptology (2008), EUROCRYPT.

Kerschbaum, F. Frequency-hiding order-preserving encryption. In Proceedings of the 22nd ACM Conference on Computer and Communications Security (2015), CCS.

Kerschbaum, F., and Schropfer, A.. Optimal average-complexity ideal-security order-preserving encryption. In Proceedings of the 21st ACM Conference on Computer and Communications Security (2014), CCS.

Krendelev, S., Yakovlev, M., and Usoltseva, M. Secure database using order-preserving encryption scheme based on arithmetic coding and noise function. In Proceedings of the 3rd IFIP International Conference on Information and Communication Technology (2015), ICT-EurAsia.

Li, K., Zhang, W., Yang, C., and Yu, N. Security analysis on one-to-many order preserving encryption-based cloud data search. IEEE Transactions on Information Forensics and Security 10, 9 (2015).

Liu, D., and Wang, S. Programmable order-preserving secure index for encrypted database query. In Proceedings of the 5th International Conference on Cloud Computing (2012), CLOUD.

Liu, D., and Wang, S. Nonlinear order preserving index for encrypted database query in service cloud environments. Concurrency and Computation: Practice and Experience 25, 13 (2013), 1967-1984.

Lu, Y. Privacy-preserving logarithmic-time search on encrypted data in cloud. In Proceedings of the 19th Network and Distributed System Security Symposium (2012), NDSS.

(56) References Cited

OTHER PUBLICATIONS

Mavroforakis, C., Chenette, N., O'Neill, A., Kollios, G., and Canetti, R. Modular order-preserving encryption, revisited. In Proceedings of the ACM International Conference on Management of Data (2015), SIGMOD.

McCarthy, K. Panama papers hack: unpatched wordpress, drupal bugs to blame? http://www.theregister.co.uk/2016/04/07/panama_papers_unpatched_wordpress_drupal/, 2016.

Naveed, M. The fallacy of composition of oblivious RAM and searchable encryption. Tech. Rep. 668, IACR Cryptology ePrint Archive, 2015.

Ozsoyoglu, G., Singer, D. A., and Chung, S. S. Anti-tamper databases: querying encrypted databases. In Proceedings of the 17th Conference on Data and Application Security (2003), DBSEC.

Naveed, M., Prabhakaran, M., and Gunter, C. Dynamic searchable encryption via blind storage. In Proceedings of the 35th IEEE Symposium on Security and Privacy (2014), S&P.

Popa, R. A., Li, F. H., and Zeldovich, N. An ideal-security protocol for order-preserving encoding. In 34th IEEE Symposium on Security and Privacy (2013), S&P.

Popa, R. A., Redfield, C. M. S., Zeldovich, N., and Balakrishnan, H. Cryptdb: protecting confidentiality with encrypted query processing. In Proceedings of the 23rd ACM Symposium on Operating Systems Principles (2011), SOSP.

Shi, E., Bethencourt, J., Chan, H. T.-H., Song, D. X., and Perrig, A. Multi-dimensional range query over encrypted data. In Proceedings of the 2007 Symposium on Security and Privacy (2007), S&P.

Song, D. X., Wagner, D., and Perrig, A.. Practical techniques for searches on encrypted data. In Proceedings of the 21st IEEE Symposium on Security and Privacy (2000), S&P.

Stefanov, E., Papamanthou, C., and Shi, E Practical dynamic searchable symmetric encryption with small leakage. In Proceedings of the 21st Network and Distributed System Security Symposium (2014), NDSS.

Teranishi, I., Yung, M., and Malkin, T. Order-preserving encryption secure beyond one-wayness. In Proceedings of be 20th International Conference on Advances in Cryptology (2014), ASIACRYPT.

van den Hooff, J., Lazar, D., Zaharia, M., and Zeldovich, N. Vuvuzela: scalable private messaging resistant to traffic analysis. In Proceedings of the 25th Symposium on Operating Systems Principles (2015), SOSP.

Wang, P., and Ravishankar, C. Secure and efficient range queries on outsourced databases using rp-trees. In Proceedings of the 30th IEEE International Conference on Data Engineering (2013), ICDE.

Wozniak, S., Rossberg, M., Grau, S., Alshawish, A., and Schaefer, G. Beyond the ideal object: towards disclosure-resilient order-preserving encryption schemes. In Proceedings of the ACM Workshop on Cloud Computing Security Workshop (2013), CCSW.

Xiao, L., and Yen, I.-L. A note for the ideal order-preserving encryption object and generalized order-preserving encryption. Tech. Rep. 350, IACR Cryptology ePrint Archive, 2012.

Xiao, L., Yen, I.-L., and Fluynh, D. T. Extending order preserving encryption for multi-user systems. Tech. Rep. 192, IACR Cryptology ePrint Archive, 2012.

Zhang, Y., Katz, J., and Papamanthou, C. All your queries are belong to us: the power of le-injection attacks on searchable encryption. In Proceedings of the 25th USENIX Security Symposium (2016), USENIXSEC.

* cited by examiner

$$\text{function } \text{ENCRYPT}(m, k)$$
$$\quad C \leftarrow \text{RND.ENCRYPT}(m, K)$$
$$\quad b \leftarrow 0$$
$$\quad t \leftarrow n - 1$$
$$\quad \text{while } b \leq t \text{ do}$$
$$\quad\quad (D, NULL) \leftarrow \text{GET}(b + \lfloor (t-b)/2 \rfloor)$$
$$\quad\quad d \leftarrow \text{RND.DECRYPT}(D, K)$$
$$\quad\quad \text{if } d < m + R \bmod N \text{ then}$$
$$\quad\quad\quad b \leftarrow b + \lfloor (t-b)/2 \rfloor + 1$$
$$\quad\quad \text{else if } d > m + R \bmod N \text{ then}$$
$$\quad\quad\quad t \leftarrow b + \lfloor (t-b)/2 \rfloor - 1$$
$$\quad\quad \text{else}$$
$$\quad\quad\quad c \leftarrow \text{RANDOM}(1)$$
$$\quad\quad\quad \text{if } c = 0 \text{ then}$$
$$\quad\quad\quad\quad b \leftarrow b \lfloor (t-b)/2 \rfloor + 1$$
$$\quad\quad\quad \text{else}$$
$$\quad\quad\quad\quad t \leftarrow b + \lfloor (t-b)/2 \rfloor - 1$$
$$\quad\quad\quad \text{end if}$$
$$\quad\quad \text{end if}$$
$$\quad \text{end while}$$
$$\quad \text{INSERT}(C, b)$$
$$\quad n \leftarrow n + 1$$
$$\quad r \leftarrow \text{RANDOM}(n)$$
$$\quad \text{ROTATE}(r)$$
$$\quad (D, NULL) \leftarrow \text{GET}(0)$$
$$\quad R \leftarrow N - \text{RND.DECRYPT}(D, K) \bmod N$$
$$\text{end function}$$

LEAKAGE-FREE ORDER-PRESERVING ENCRYPTION

BACKGROUND

Unless otherwise indicated herein, the approaches described in this section are not prior art to the claims in this application and are not admitted to be prior art by inclusion in this section.

Embodiments relate to computer security, and in particular to methods and apparatuses implementing leakage-free order-preserving encryption Order-preserving encryption may offer a number of benefits. One benefit is being efficiently (logarithmic time) searchable. Another benefit of order-preserving encryption is that it can be searched using the same operations (comparisons) as plaintext.

However, recent attacks on cloud infrastructure have highlighted certain risks of deterministic encryption schemes. Some attacks use only the ciphertexts (e.g., as obtained after a database compromise) and imprecise background knowledge available for some data sets. No further passive monitoring (e.g. queries, updates, etc.) or active attacks (e.g. result modifications, insertions, etc.) on the database are necessarily performed. Hence these attacks exploit only static leakage and are simple to execute.

In at least one case, passwords encrypted using a deterministic procedure were broken. The cryptanalysis was performed on stolen ciphertexts only (using additional plaintext hints). The hackers are able to break in, access, and copy sensitive information without necessarily observing any on-going activities of users or administrators. Instead the hackers leveraged access to gain as much data as possible in a short time (i.e., the adversary obtained a static snapshot).

SUMMARY

Embodiments implement leakage-free order-preserving encryption by assigning a distinct ciphertext for each plaintext, including repeated plaintext whose ciphertext is randomly inserted. In order to conceal insertion order, the randomized ciphertexts are compressed to minimal ciphertext space. A uniform distribution is achieved by rotating about a modulus on the ciphertexts rather than the plaintexts. The resulting ciphertext distribution has no leakage from the ciphertexts even if an adversary has perfect background knowledge on the distribution of plaintexts. The encryption may be further secured even against passive query monitoring attacks by hiding the access pattern using $\epsilon$, $\delta$-differential privacy, such that the adversary observing a sequence of queries will not learn the frequency of plaintext. The static leakage-free order-preserving encryption may be converted into an adjustable encryption scheme to allow querying (e.g., on a remote server).

An embodiment of a computer-implemented method comprises encrypting plaintext into randomized ciphertext by inserting repeated plaintext elements at random locations, converting the randomized ciphertext into a compressed ciphertext space according to a probabilistic encryption scheme, and performing a rotation of the compressed ciphertext space about a modulus to create distributed ciphertext. The distributed ciphertext is communicated for storage in a server database, and a query is communicated to the server. A query result received from the server in response to the query is encrypted.

A non-transitory computer readable storage medium embodies a computer program for performing a method comprising encrypting plaintext into randomized ciphertext by inserting repeated plaintext elements at random locations, and converting the randomized ciphertext into a compressed ciphertext space according to a probabilistic encryption scheme. A rotation of the compressed ciphertext space about a modulus is performed to create distributed ciphertext. The distributed ciphertext is encrypted to a high strength according an adjustable encryption scheme for communication to the server. The encrypted distributed ciphertext is communicated at the high strength to a server for storage in a database, and a query is communicated to the server. A query result received from the server in response to the query is decrypted, the query result being in a lower strength of the adjustable encryption scheme.

A computer system comprises one or more processors and a software program, executable on said computer system. The software program configured to cause an in-memory database engine to receive distributed ciphertext achieved by rotation about a modulus and adjustably encrypted at a high strength, to store the distributed ciphertext at the high strength in a database, and to receive a query. The software program is configured to cause the in-memory database engine to decrypt the distributed ciphertext to a lower strength, to apply the query to the distributed ciphertext at the lower strength to produce a query result encrypted at the lower strength, and to communicate the query result to a client.

Certain embodiments further comprise encrypting the distributed ciphertext to a high strength according an adjustable encryption scheme for communication to the server, wherein the query result is decrypted from a lower strength of the adjustable encryption scheme.

According to some embodiments the adjustable encryption scheme stores a binary tree.

In various embodiments the binary tree is self-balancing.

In particular embodiments the lower strength comprises deterministic encryption or order preserving encryption.

In certain embodiments decrypting the query result comprises updating the modulus based upon a further rotation performed at the server.

Some embodiments further comprise applying a differential privacy procedure to generate the query as a private query.

In certain embodiments the private query includes positive noise added by the differential privacy procedure.

Particular embodiments further comprise a client engine communicating a fake query to the server.

In some embodiments the high strength comprises probabilistic encryption and the lower strength comprises deterministic encryption or order preserving encryption.

According to various embodiments the in-memory database engine is configured to further rotate the distributed ciphertext prior to storage in the database, and to communicate to the client an updated modulus.

In specific embodiments the in-memory database engine is configured to receive the query as a private query including positive noise.

According to certain embodiments the in-memory database engine is configured to distinguish the query from a fake query also received from the client.

The following detailed description and accompanying drawings provide a better understanding of the nature and advantages of embodiments.

DETAILED DESCRIPTION

Described herein are methods and apparatuses implementing leakage-free order preserving encryption. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Embodiments implement static leakage-free order-preserving encryption by assigning a distinct ciphertext for each plaintext, including repeated plaintext whose ciphertext is randomly inserted. In order to conceal insertion order, the randomized ciphertexts are compressed to minimal ciphertext space. A uniform distribution is achieved by rotating about a modulus on the ciphertexts rather than the plaintexts. The resulting ciphertext distribution has no leakage from the ciphertexts even if an adversary has perfect background knowledge on the distribution of plaintexts. The encryption may be further secured even against passive query monitoring attacks by hiding the access pattern using $\epsilon, \delta$-differential privacy, such that the adversary observing a sequence of queries will not learn the frequency of plaintext. The static leakage-free order-preserving encryption may be converted into an adjustable encryption scheme to allow querying (e.g., on a remote server).

Figure 1:
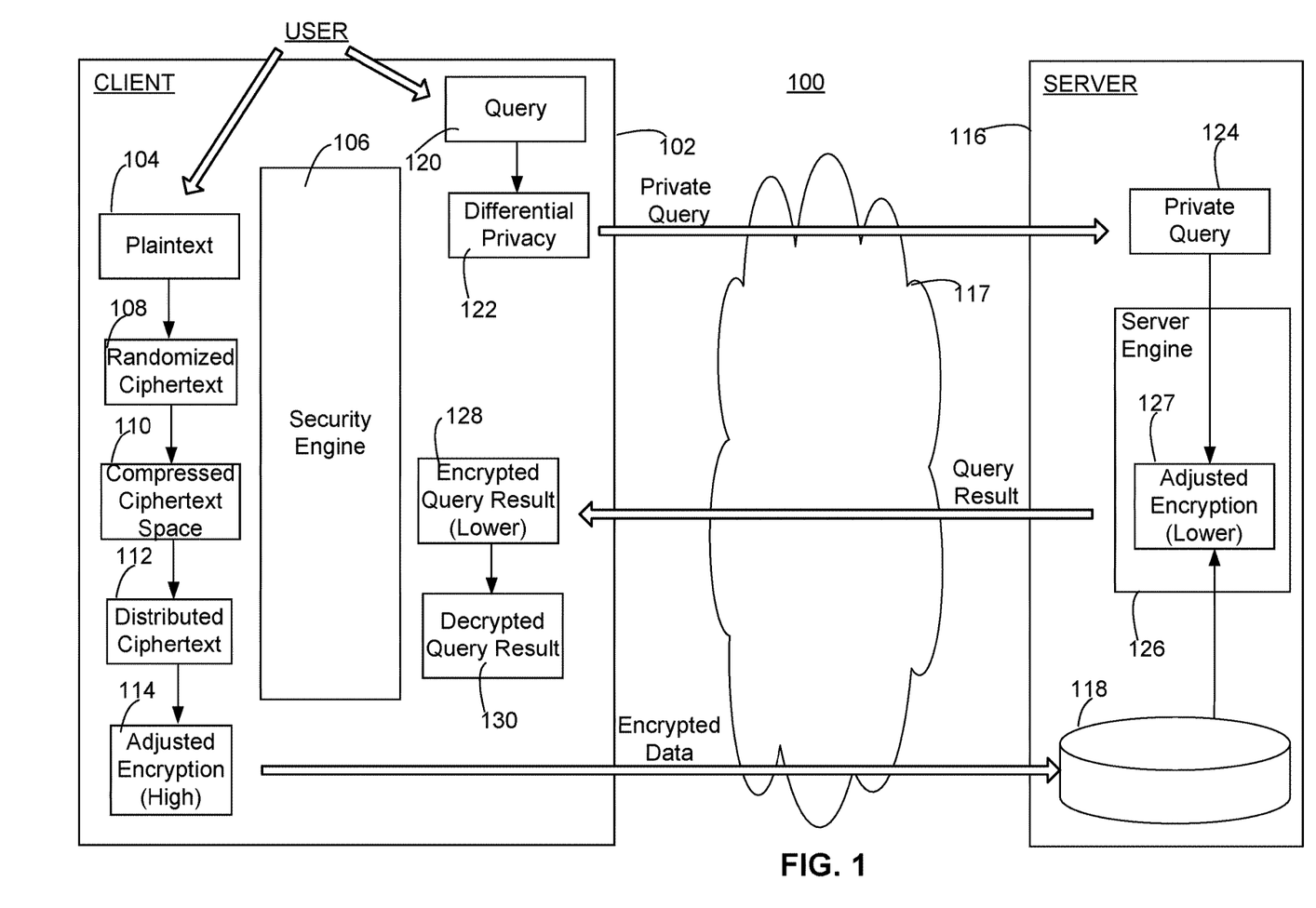
FIG. 1 shows a simplified diagram of a system according to an embodiment.

FIG. 1 shows a simplified view of a system configured to implement leakage-free order preserving encryption according to an embodiment. Specifically, system 100 comprises a client 102 having stored thereon data in the form of plaintext 104 that is to be stored remotely in a secure manner for access (e.g., querying).

A security engine 106 present at the client, first converts the plaintext into randomized ciphertext 108. During this process, a ciphertext is inserted for each plaintext. Ciphertext corresponding to repeated plaintext is inserted at random locations (e.g., utilizing a random tree traversal technique).

Next, the randomized ciphertext is compressed into minimal ciphertext space 110 utilizing probabilistic encryption. This conceals the insertion order.

Then, the compressed ciphertext is subjected to order-preserving encryption by rotation about a modulus to achieve a uniform distribution, producing the distributed ciphertext 112. As further discussed below, according to a static encryption procedure, this rotation is performed on the ciphertext space as a whole. According to a dynamic encryption procedure, this rotation is performed after each insertion of ciphertext.

Finally, the distributed ciphertext is subjected to further, adjusted encryption in order to be in a strongest encrypted form 114. An example of such strong encryption is probabilistic IND-CPA secure encryption.

As further discussed in detail below, the adjusted encryption may take place according to a static encryption procedure or a dynamic encryption procedure. A static adjusted encryption procedure may store a binary sorted tree. The dynamic adjusted encryption procedure may employ a self-balancing binary tree.

The adjusted encrypted data created at the client, is then forwarded to the server 116 via a network 117. There it is stored in highly secure form within database 118. The data stored in this highly encrypted form, however, is not available for searching.

It is noted that the security engine may perform additional processing of the adjusted encrypted data prior to its storage. For example, as part of a dynamic encryption procedure preceding the adjustable encryption, the server engine may perform a further rotation. This is further discussed below in connection with the example.

FIG. 1 further shows the client formulating a query 120 for accessing the data stored on the server. However, information present in the query itself may provide an attacker with insight leading to a security breach.

Accordingly, prior to being sent over the network to the server, the query is subjected to a differential privacy procedure 122 in order to create a private query 124. As described in the example below, this differential privacy procedure may involve the addition of (positive) noise to the query values.

That private query is then communicated over the network to the server for processing on the data stored securely in the database. It is noted that the client may also employ other tactics (e.g., issuing false queries), in order to further preserve system security.

As mentioned above, the adjusted encrypted data in its strongest form stored in the database, is not available for searching. However, an engine 126 on the server is configured to decrypt the adjusted encrypted data to a lower form of encryption 127 that is amenable to search. Examples of such a lower encryption scheme can include deterministic or order-preserving encryption.

The server engine processes the query on the database in order to furnish a query result 128 in the lower encrypted form. That query result is then communicated to the client, where it can be converted into decrypted form 130 for display, local storage, and manipulation by a user. Where the server engine has performed further rotation of ciphertext as part of a dynamic encryption procedure of a plaintext stream, such processing by the security engine may involve rotation about an updated modulus that reflects further rotation performed by the server engine.

Figure 2:
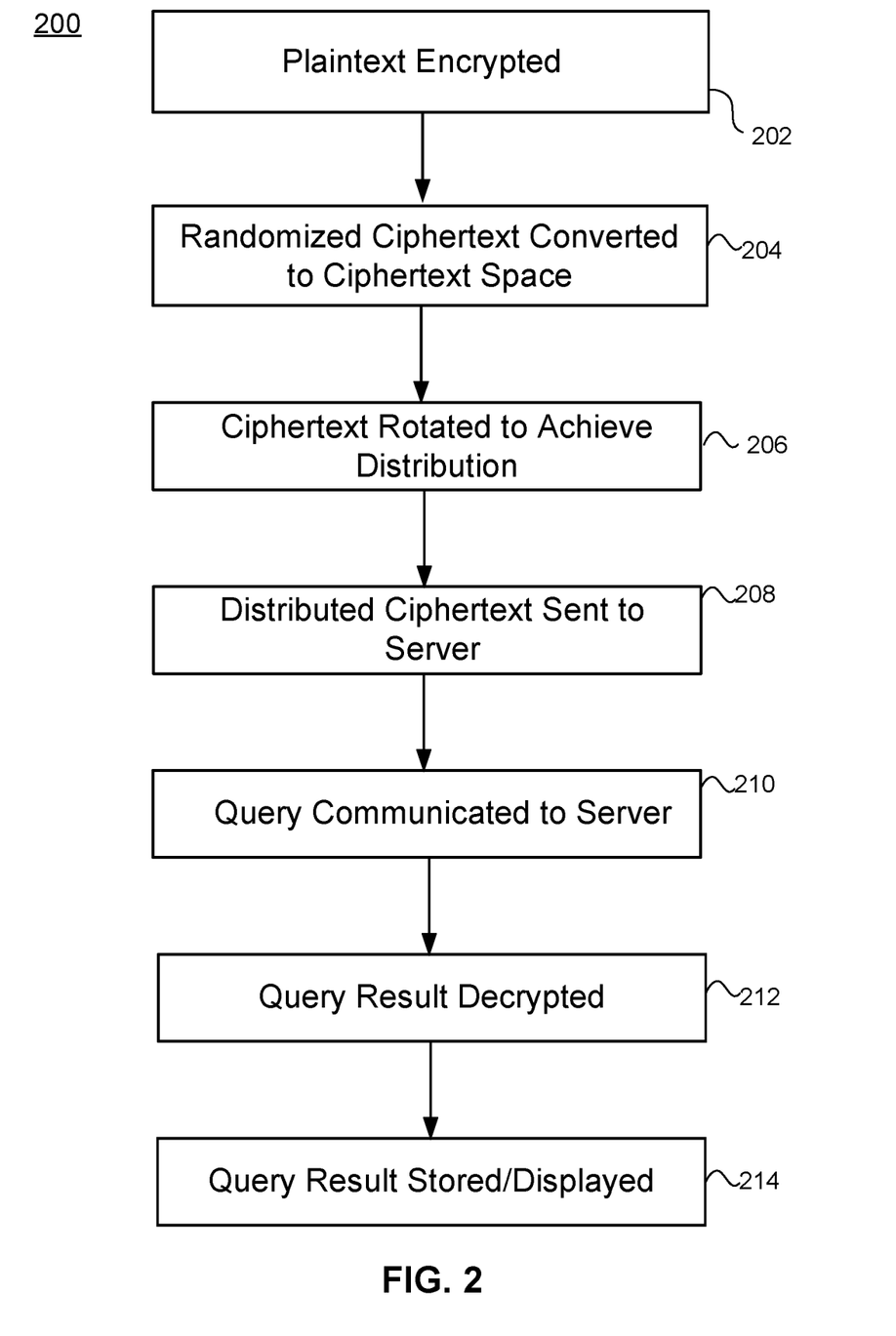
FIG. 2 shows a simplified flow diagram of a method according to an embodiment.

FIG. 2 is a simplified flow diagram showing a method 200 according to an embodiment. At 202, plaintext is encrypted into randomized ciphertext by inserting repeated plaintext elements at random locations.

At 204 the randomized ciphertext is converted into a compressed ciphertext space according to a probabilistic encryption scheme. At 206 a rotation of the compressed ciphertext space about a modulus creates distributed ciphertext.

At 208, the distributed ciphertext is communicated for storage in a database of a server. At 210 a query is communicated to the server. This query may be in the form of a secure private query.

At 212 a query result received from the server in response to the query, is decrypted. At 214 the query result is stored and presented for display to a user.

Example

An example is now presented in connection with a series of attacks on deterministic encryption, but which may also extend to order-preserving encryption. Also considered are the impacts of attacks on frequency-hiding order-preserving encryption (FHOPE), a secure form of order-preserving encryption.

These attacks use only the ciphertexts—as obtained after a database compromise—and (imprecise) background knowledge. Background knowledge is readily available for many data sets.

In this example, two auxiliary data sets may be used for background knowledge: one from the same source as the target data, and one from a different source. No further passive monitoring (e.g. queries, updates, etc.) or active attacks (e.g. result modifications, insertions, etc.) on the database are performed. The attacks hence only exploit static leakage and are simple to execute.

Let $\mathbb{C}$ be the multi-set (a multi-set may potentially include duplicate values) of ciphertexts. Let $\mathbb{M}$ be the multi-set of plaintexts in the background knowledge of the adversary.

For simplicity only one database column is considered and semantic constraints are ignored. However, embodiments are still as secure for a single column as for a set of columns under arbitrary semantic constraints. It is assumed that the sizes of the multi-sets are equal: $n=|\mathbb{C}|=|\mathbb{M}|$.

The frequency analysis attack computes the histograms Hist($\mathbb{C}$) and Hist($\mathbb{M}$) of the two multi-sets. Then it sorts the two histograms in descending order: $\vec{c}$=Sort(Hist($\mathbb{C}$)) and $\vec{m}$=Sort(Hist($\mathbb{M}$)). The cryptanalysis for $c_i$ is $m_i$, i.e. the two vectors are aligned.

$l_P$ optimization is as follows. The frequency analysis is refined to the $l_P$-optimization attack. In this refinement the two histograms are not simply sorted and aligned, but a global minimization is run to find an alignment. Let $\mathbb{X}$ be the set of n×n permutation matrices. The attack then finds X∈ $\mathbb{X}$, such that the distance $//\vec{c}-X\vec{m}//_P$ is minimized under the $l_P$ distance. For many distances $l_P$ the computation of X can be efficiently (polynomial in n) performed using an optimization procedure, such as linear programming. The cryptanalysis for $c_i$ is $X(m)_i$, i.e. the two vectors are aligned after permutation.

The attack works not only for order-preserving encryption, but also for deterministic encryption. The attack is successful in experimentally recovering hospital data—even for such deterministic encryption, with an accuracy of 100% for 100% and 95% of the hospitals for the binary attributes of "mortality" (whether a patient has died) and "sex", respectively, under deterministic encryption.

This attack is presumably already prevented by FH-OPE. However, the attack is not meant for order preserving encryption and the sorting attack may still work for FH-OPE.

The sorting attack is now described. Let $\mathbb{D}$ be the domain of all plaintexts in multi-set $\mathbb{M}$. Let $N=|\mathbb{D}|$ be the size of the domain $\mathbb{D}$. The sorting attack assumes that $\mathbb{C}$ is dense, i.e. contains a ciphertext c for each m∈ $\mathbb{D}$. The adversary computes the unique elements Unique($\mathbb{C}$) and sorts them $\vec{c}$=Sort(Unique($\mathbb{C}$)) and the domain $\vec{d}$=Sort($\mathbb{D}$). The cryptanalysis for $c_i$ is $d_i$, i.e. the order of the ciphertext and the plaintext are matched.

The attack is 100% accurate, if the ciphertext multi-set is dense. For this assumption, a refinement may be presented that works also for low-density data. The cumulative attack is now described before extending the sorting attack to FH-OPE.

The cumulative attack cleverly combines the $l_P$-optimization and sorting attack. The adversary first computes the histograms $\vec{c}_1$=Hist($\mathbb{C}$), $\vec{m}_1$=Hist($\mathbb{M}$) and the cumulative density functions $\vec{c}_2$=CDF($\mathbb{C}$), $\vec{m}_2$=CDF($\mathbb{M}$) of the cipher- and plaintexts. The attack then finds the permutation X∈$\mathbb{X}$, such that the sum of the distances between the histograms and cumulative density functions $//\vec{c}_1-X\vec{m}_1//_P+//\vec{c}_2-X\vec{m}_2//_P$ is minimized. Again, this can be done using efficient optimization procedures. The cryptanalysis for $c_i$ is $X(m)_i$.

The attack is very accurate against deterministic order preserving encryption, with an accuracy of 99% for 83% of the large hospitals for the attributes of "age". The age column is certainly not low-density, but it is also not dense (as the success rate shows).

This attack is again presumably prevented by FH-OPE, since no frequency information is available. However, the sorting attack is not necessarily prevented and maybe extended—in a similar fashion to the cumulative attack—to FH-OPE.

An extended Sorting Attack on FH-OPE is now described. The extended sorting attack on FH-OPE proceeds as follows. The adversary sorts the multi-sets $\vec{c}$=Sort($\mathbb{C}$) and $\vec{m}$=Sort($\mathbb{M}$), i.e. it is not necessary to only use unique values. The cryptanalysis for $c_i$ is $m_i$. Note that in FH-OPE every element $c_i \in \mathbb{C}$ is unique, but after the attack aligned to the cumulative density function of $\mathbb{M}$ as in the cumulative attack.

The accuracy for this attack can be high depending on the precision of the background knowledge $\mathbb{M}$. It can be dangerous to make assumptions about the adversary's background knowledge, since they are hard, if not impossible, to verify and uphold. Hence, in the security model for SLF-OPE perfect background knowledge of the adversary is assumed, i.e. the multi-set $\mathbb{M}$ is the exact same multi-set as the plaintexts of the ciphertexts. The extended sorting attack then succeeds with 100% accuracy.

A security model according to embodiments is now described. The security model is stronger than indistinguishability under ordered chosen plaintext attack (IND-OCPA) and indistinguishability under frequency-analyzing ordered chosen plaintext attack (IND-FAOCPA) since it implies both of them. Loosely speaking, the model states that the adversary cannot gain non-negligible information from the ciphertexts.

The model is motivated by recent attacks on cloud infrastructure, including real world incidents showing the risks of deterministic—not even order-preserving—encryption. For example, in at least one case passwords were encrypted using a deterministic procedure and were many subsequently broken. The cryptanalysis was performed on stolen ciphertexts only (using additional plaintext hints). Other hacking incidents have been recently publicized that resulted in leakage of sensitive information—not necessarily ciphertexts.

The attacks share a common "anatomy". The hackers are capable to break in, access, and copy sensitive information. They did not observe any on-going activities of users or administrators. Instead they used the opportunity of access to gain as much data as possible in a short time, i.e. the adversary obtains a static snapshot. Note that this does not rule out the revelation of more sophisticated, longitudinal attacks in the future, but underpins the pressure to secure current systems.

In this respect the model achieves the following: an attacker gaining access to all ciphertexts stored in an encrypted database does not gain any additional information to his background knowledge. Perfect background knowledge is assumed, i.e. the adversary already knows all plaintexts (but not the correspondence to the ciphertexts). This may sound contradictory at first—why would someone break into a database which data he knows? However, if security is demonstrated under such weak assumptions, security holds even if the adversary has less background knowledge. Moreover, the adversary may not be interested in breaking a single column (such as age), but in learning the semantic constraints (such as John Doe's age). Although the model only considers a single database column, it is still as secure for a set of columns under arbitrary semantic constraints, since absolutely no additional information is leaked from each column.

A non-interactive definition of the order-preserving encryption scheme is now provided. Let $\lambda$ be the security parameter of a standard symmetric encryption scheme such as AES. Later below, an interactive definition allowing for incremental encryptions. An order-preserving encryption scheme $\Pi_{SLF-OPE}$ comprises the following three procedures:

k←KeyGen($\lambda$): generates a secret state k according to the security parameter $\lambda$.

C←Encrypt($\mathbb{M}$, k): computes the set of ciphertexts $\mathbb{C}$ for the multi-set of plaintexts $\mathbb{M}$.

$m_i$←Decrypt($c_j$, k): Computes the plaintext $m_i \in \mathbb{M}$ for ciphertext $c_j \in \mathbb{C}$ using key k.

The security model can now be formulated as a game between an adversary and a challenger. Let n be the number of plaintexts. Our game $Game_{SCA}(\lambda,n)$ for a static ciphertext attack proceeds as follows:

1. The challenger executes k←KeyGen($\lambda$) and stores the key.
2. The adversary chooses n plaintexts $m_i \in \mathbb{D}$. Let $\mathbb{M}=(m_0, \ldots, m_{n-1})$ be the multi-set of plaintexts. The adversary sends $\mathbb{M}$ to the challenger.
3. The challenger executes $\mathbb{C}$←Encrypt($\mathbb{M}$, k) and sends $\mathbb{C}$ to the adversary.
4. The adversary chooses an index $0 \leq i < n$ and outputs its guess $\gamma_j$ of $c_j$←Encrypt($m_j$, k)$\in \mathbb{C}$.

Note that at first it may seem counterintuitive to have the adversary guess a ciphertext. However, any restrictions on the entropy of the plaintexts are intentionally not enforced. Hence, in the reverse definition of the challenge (guessing a plaintext for a ciphertext) the adversary may take advantage of the entropy, e.g. by guessing the most frequent plaintext. Therefore the adversary guesses the reverse association in order to strictly bound the accuracy independent of the plaintext entropy. The ability to guess the corresponding ciphertext in combination with knowledge of the plaintext also implies the ability to decrypt that ciphertext.

Security against a static ciphertext attack is defined as follows. Definition 1: an order-preserving encryption scheme $\Pi_{SLF-OPE}$ is IND-SCA secure against static ciphertext attack if the adversary A's advantage of outputting $c_j$ in $Game_{SCA}(\lambda, n)$ is at most negligibly in $\lambda$ better than guessing $c_j$ from $\mathbb{C}$, i.e.

$$Pr[A(Game_{SCA}(\lambda, n)) = i, c_j] < \frac{1}{n} + \frac{1}{poly(\lambda)}$$

Impact on attacks is now discussed. IND-SCA security is stronger than any previous definition for order-preserving encryption. It implies that a static adversary does not even learn the order of ciphertexts. How to nevertheless perform range queries on the data, is explained later below. In this sense the security model implies a static leakage-free encryption system.

Now revisiting the attacks, first the security model fully captures the attack setup. The adversary is given full ciphertext information and even has perfect background knowledge. Second, the security definition implies that if the adversary is then able to infer even one plaintext better than guessing (from background knowledge) the scheme is broken. Hence, instead of an attack accuracy close to 100%, embodiments can and must expect a much lower accuracy (depending on the entropy of the database column).

All attacks except the sorting attack exploit specific leaked information: frequency of plaintexts. This information is clearly not statically available in the encryption scheme. The sorting attack also exploits other leaked information: the order. This information is also not statically available in the encryption scheme. It is hence consequential that the attacks are thwarted.

An order-preserving encryption scheme that fulfills the IND-SCA security definition is now presented. The system architecture is described and the intuition of the construction is given. A static encryption procedure is first presented that encrypts all plaintexts at once, and second that encryption procedure is extended into an interactive protocol that incrementally encrypts ciphertexts.

The system architecture assumes a client holding the secret key k←KeyGen($\lambda$) and server that holds the ciphertexts. The server may hold several multi-sets of ciphertexts managed independently for each database column. In the static version the client performs $\mathbb{C}$←Encrypt($\mathbb{M}$, k) and sends $\mathbb{C}$ to the server. The client can issue a query Q, e.g. a range query, to the server which responds with a set $\mathbb{C}_Q$ of ciphertexts. The query procedure is described later below. In the interactive version the encryption procedure is changed to an interactive protocol.

$c_j$; S'←Encrypt(($m_i$, k), (S)): Is a secure protocol between the client and the server. The client's input is the plaintext mi and the secret key k. The server's input is its current state S. The server only learns the ciphertext $c_j$ and updates its state to S'. The server does not learn $m_i$ or k.

Figure 3:
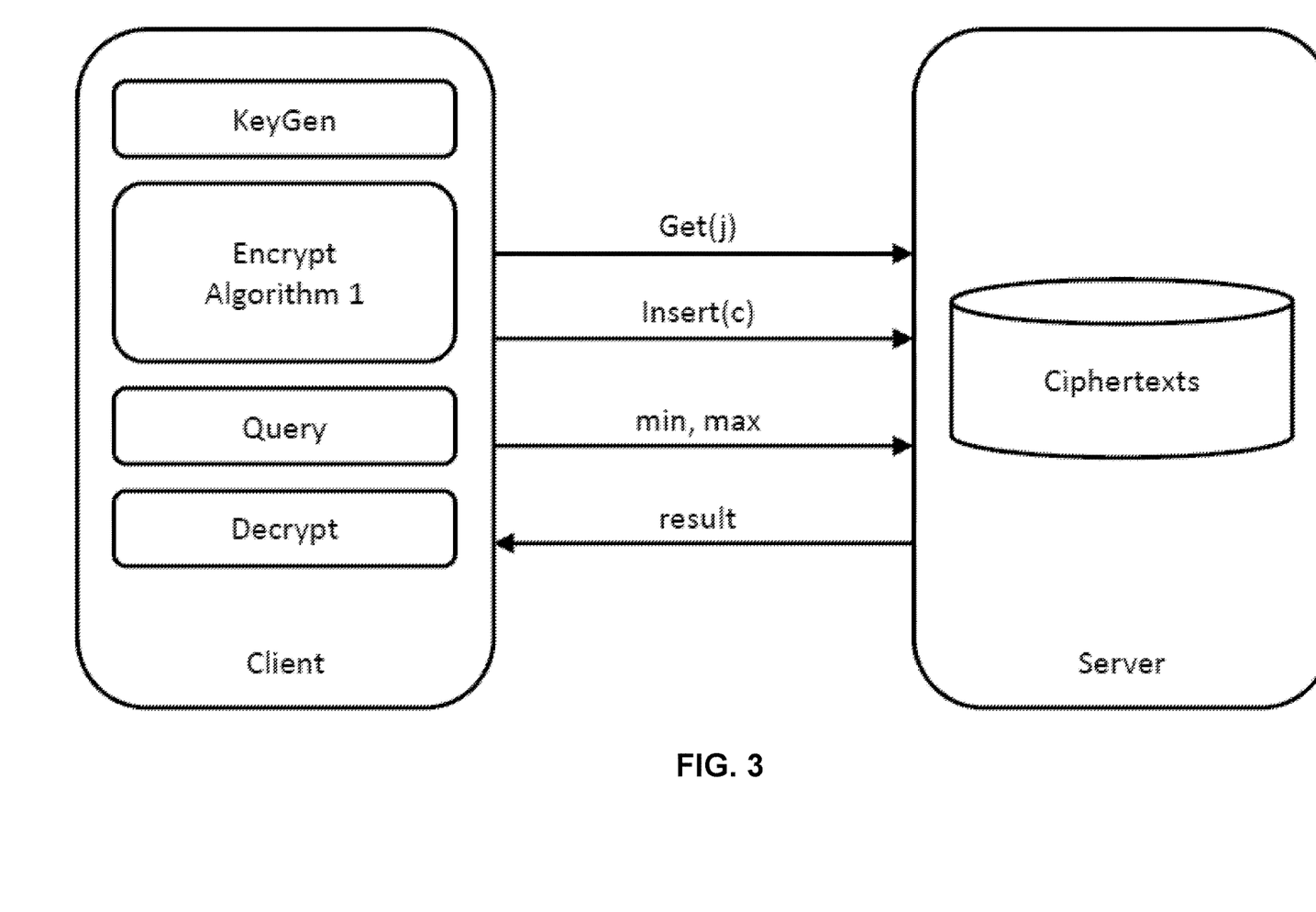
FIG. 3 shows an overview of a system architecture according to an example.

FIG. 3 depicts an overview of the architecture. It is assumed that the server is semi-honest, i.e. only performs passive attacks. In the simplified system model active attacks cannot compromise the confidentiality of the data, but only the integrity, since the server obtains no information about the plaintexts from any procedure or protocol. This model is commonly assumed in the scientific literature on database security.

The SLF-OPE encryption scheme combines ideas of three previous order-preserving encryption schemes. One provides the basis for managing the order of ciphertexts in a stateful, interactive manner. Of course, this scheme is not secure against the attacks since it is deterministic. A second adds a frequency-hiding aspect. This scheme cannot be used as the basis of an IND-SCA secure scheme, since it partially leaks the insertion order. The leakage of the insertion order is implied in IND-FAOCPA (and IND-OCPA), but detrimental to IND-SCA security. Therefore the frequency-hiding idea needs to be fit into the first scheme. This is done by encrypting the plaintext using a probabilistic procedure and also inserting a ciphertext for each plaintext using random tree traversal. This combined construction would still be only IND-FAOCPA secure. Third and last, a modular order-preserving encryption idea is applied. This idea rotates the plaintexts around a modulus statically hiding the order. However, modular order-preserving encryption has been developed for deterministic order-preserving encryption. In the probabilistic order-preserving encryption the modulus is to be applied to the ciphertexts. This can be done in the static version of the encryption procedure. In the interactive version of the procedure ciphertexts are necessarily mutable and hence the rotation is to be reapplied after each encryption. Details are presented below.

The static encryption procedure is now described. Let RND be a standard, IND-CCA secure, symmetric encryption scheme, e.g. AES in CCM mode. This encryption scheme RND supports the following procedures: KeyGen, Encrypt, and Decrypt. The procedures of the static version of our SLF-OPE scheme are now described.

1. k←KeyGen($\lambda$): Execute K←RND.KeyGen($\lambda$) and uniformly choose $0 \le r < n$. Let k=(K, r).
2. $\mathbb{C}$←Encrypt($\mathbb{M}$, k): Execute C←RND. Encrypt($m_i$, K). Let $c_j$=(C, j) for j=i+r mod n.
3. $m_i$←Decrypt($c_j$, k): Parse $c_j$ as (C, j). Let $m_i$=RND.Decrypt(C,K).

A security proof is now provided. As a first step in order to prove security of our static encryption scheme, a simulator is given the view of the adversary without input of the plaintexts. If the adversary's view is independent of its messages, then the encryption scheme cannot leak any information about the plaintexts.

Lemma 2. There exists a simulator S($\lambda$, n) outputting $\overline{\mathbb{C}}$, such that the adversary A's view $\mathbb{C}$ in game $Game_{SCA}$ is computationally indistinguishable from $\overline{\mathbb{C}}$. According to the proof, the simulator proceeds as follows. It executes K←RND. KeyGen($\lambda$) and uniformly and independently chooses $m_i$ from $\mathbb{D}$ ($0 \le i < n$). It then computes $\overline{\mathbb{C}}$ ←RND.Encrypt($m_j$, K) and sets $\overline{c}_j$=($\overline{\mathbb{C}}$, j) ($0 \le j < n$). The two sets $\overline{\mathbb{C}}$ and $\mathbb{C}$ are computationally indistinguishable, since $\overline{c}$ and $\mathbb{C}$ are computationally indistinguishable due to the IND-CCA security of the encryption scheme RND and j ranges 0 to n−1 in both cases.

However, computational indistinguishability is not sufficient for IND-SCA security. Hence, as a second step we prove that the structure of the encryption is (sufficiently) independent of the plaintexts.

Lemma 3. Any ciphertext $c_j$ has equal probability to be plaintext $m_i$. As proof, this follows from the uniform random choice of r (which is also unknown to the adversary).

Together we can formulate the following theorem. Theorem 4. Our static encryption algorithm $\Pi_{SLF-OPE}$ is IND-SCA secure. As proof, since the encryption is independent of the plaintexts (Lemma 2) and each ciphertext has equal probability to be plaintext $m_i$ (Lemma 3), the adversary cannot succeed in game $Game_{SCA}$ with probability 1/n+1/poly($\lambda$) (sum of the random guess and the probability of the breaking the computational indistinguishability).

The dynamic encryption procedure is now described. The static procedure encrypts all plaintexts at the same time. This leads to a simple provably secure procedure. However, in most practical cases data is added incrementally. Therefore, a dynamic version is presented which can encrypt one plaintext at a time. The dynamic version is a secure protocol between the client and the server. The server only learns the ciphertext, but nothing else.

The basic idea of a dynamic protocol is as follows. The server maintains the list of ciphertexts—including the IND-CPA encrypted plaintexts. The client and server engage in an interactive binary search. When the client encounters a repeated element it flips a random coin and inserts in a random location. Second, at the end of each insert the server rotates all ciphertexts according to a uniformly chosen value.

Note that in order to be able to execute the binary search the client needs to know the modulus R of the encryption on the plaintext, since it applies a comparison with the middle element. This modulus might not be unique (due to a rotation on the ciphertexts within one plaintext) and the smaller one is chosen in case. The client retrieves the minimum ciphertext after rotation at the server and updates this modulus R.

Figure 4:
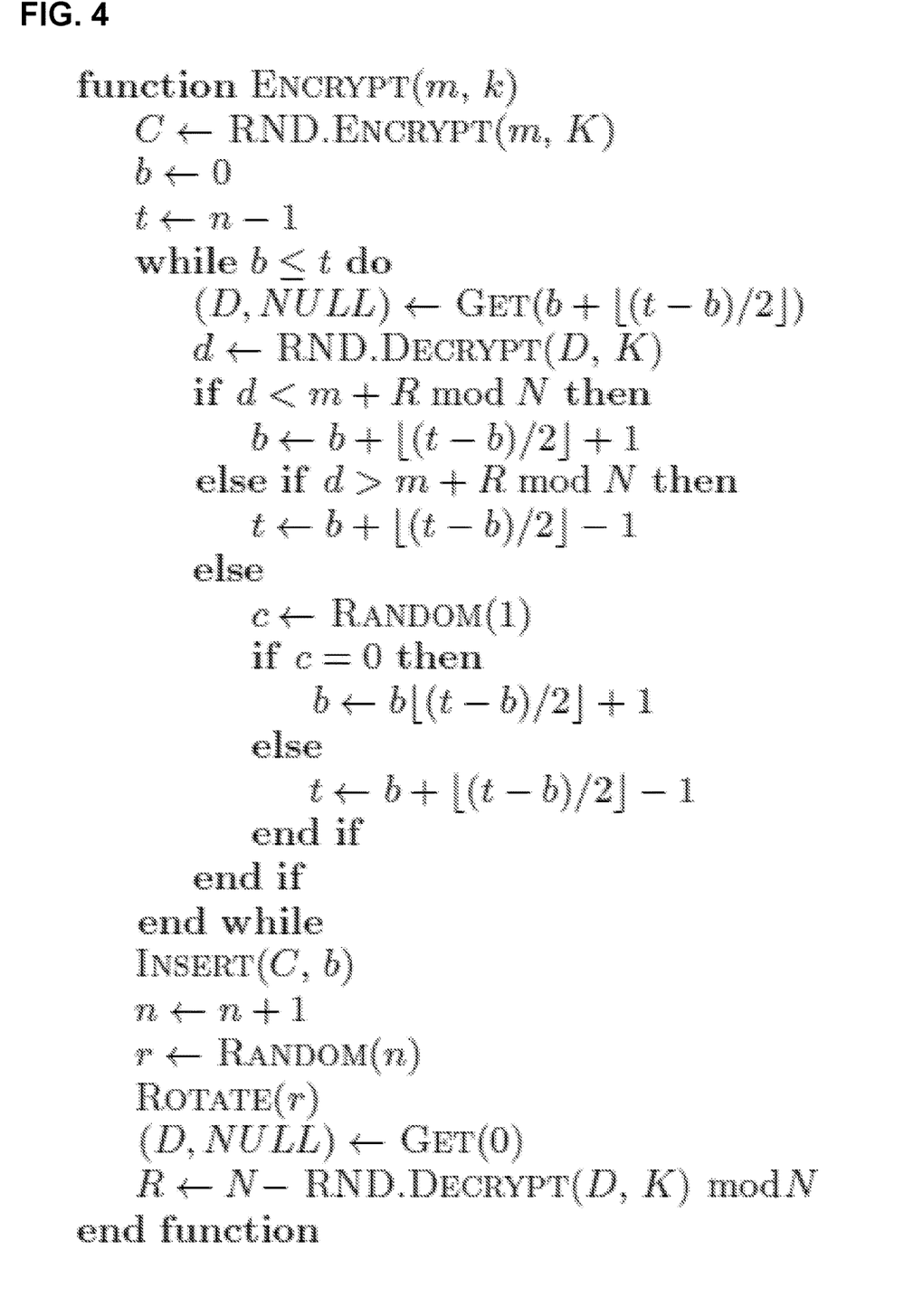
FIG. 4 shows an example of a dynamic encryption procedure.

Three sub-protocols are used with the server: Get(j) retrieves ciphertext $c_j$ from the server, Insert($c_j$) inserts ciphertext cj at the server, i.e. before the current position j and all n-j old ciphertexts $c_{j'}$ ($j \le j' < n$) are updated by incrementing j', and Rotate(r) rotates the elements. The function Random(a) returns a uniformly chosen integer between 0 and a—both inclusive. A procedure of the client in the dynamic encryption protocol is shown in FIG. 4.

A static adversary will always see a uniformly random rotation, since it was chosen freshly. Hence, the proof of IND-SCA security extends to the dynamic version. The dynamic encryption protocol has complexity O(n) at the server (due to the rotation), but only complexity O(log n) at the client which can be presumed less computationally powerful.

Querying is now described. The SCA security model for order-preserving encryption only captures encryption and decryption. Nevertheless, without the capability of search—in particular range queries—stronger encryption could be achieved. Furthermore, the efficient and flexible (because retrofittable to existing database management systems) search capabilities of order-preserving encryption distinguish it from searchable encryption. Now described is how to query an order-preserving encrypted database and how to secure the queries against a curious observer.

Searches are only performed on the order of the ciphertext, i.e. j for $c_j$. The symmetrically encrypted plaintext C can be ignored for searching.

Query rewriting is now described. Two types of queries are considered: equality and range queries. An equality search criterion is where an entry x in the database table is compared to a fixed parameter value v. An entry matches, if x==v. A range search criterion is where an entry x in the database table is compared to two fixed parameter values v and w (w log. v<w). An entry matches, if $v \le x \le w$.

In deterministic encryption equality search can be mapped to equality search on ciphertexts. However, the SLF-OPE is randomized and there may be multiple ciphertexts for a single plaintext. Hence it is needed to rewrite equality search to a range search. Let $c_{min}(v)$ be the minimal ciphertext of plaintext v and $c_{max}(v)$ be the maximal ciphertext of plaintext v.

$$c_{min}(v) = \min(c_j \in \mathbb{C} \,|\, DECRYPT(c_j,k)=v)$$

$$c_{max}(v) = \max(c_j \in \mathbb{C} \,|\, DECRYPT(c_j,k)=v)$$

A query of type x==v is then rewritten to $c_{min}(v) \le x \le c_{max}(v)$.

Similarly range queries on encrypted data need to account for multiple ciphertexts. Let $c_{max}(w)$ be the maximal ciphertext of plaintext w (similar to before for v). A range query of type $v \le x \le w$ is rewritten to $c_{min}(v) \le x \le c_{max}(w)$.

Special care needs to be taken if the plaintext v (or w) has ciphertexts at the upper and lower range of ciphertexts (i.e. if the modulus divides this plaintext v). In this case, the roles of minimal and maximal ciphertext need to be switched. We can identify this special case, if $c_{min}(v)=c_0$ and $c_{max}(v)=c_{n-1}$. Then we need to compute two different limits $c'_{min}$ and $c'_{max}$ which are the highest of the lower range and the lowest of the higher range, respectively.

$$c'_{min}(v)=\max(c_j \in \mathbb{C} \mid \forall j'(0 \leq j' < j) \cdot \text{DECRYPT}(c_{j'},k)=v)$$

$$c'_{max}(v)=\min(c_j \in \mathbb{C} \mid \forall j'(j < j' < n) \cdot \text{DECRYPT}(c_{j'},k)=v)$$

An equality query $x==v$ is rewritten to $x \leq c'_{min}(v) \vee x \geq c'_{max}(v)$. A range query $v \leq x \leq w$ (where $c_{min}(v)=c_0$ and $c_{max}(v)=c_{n-1}$ is the special case for v) is rewritten to $x \leq c_{max}(x) \vee x \geq c'_{max}(v)$. Similar rewriting rules for range queries apply, if w is the special case or if the special case plaintext m is in the range $v \leq m \leq w$.

Despite the necessary rewriting it is emphasized that both query types—equality and range—can be handled using standard range queries on the ciphertext. This implies that existing database management systems can be used to implement the queries and our SLF-OPE can still be retrofitted into them. Furthermore, advances in speeding up range queries on plaintexts—such as specialized indices—can still be used to speed up queries on encrypted data. These functionality and performance aspects clearly separate order preserving encryption from searchable encryption.

Query monitoring attacks are now described. The above discussion has presented the rewriting rules for searches over the SLF-OPE scheme. While searches are efficient, they leak additional information. Particularly, an equality query leaks $c_{min}(v)$ and $c_{max}(v)$ (or the respective special case values the query also leaks whether it is the special case by the comparison operators). Given these values (and the set of ciphertexts $\mathbb{C}$) an adversary can compute the frequency of v. However, hiding the frequency and preventing frequency analysis was a clear objective of SLF-OPE. A discussion below presents how to prevent this leakage.

Another type of leakage has been analyzed. Since a plaintext range query will almost surely never be of type $x \leq v \vee x \geq w$, range queries on ciphertext will almost surely never span the modulus r. Hence, the modulus r can be inferred from the queries. A corresponding attack and leakage prevention may use fake queries. Since the approach of fake queries is orthogonal to the approach below, both can be combined in order to provide protection against frequency and modulus leakage.

Differential privacy is now discussed. Differential privacy is a security (or privacy) definition that given a randomized procedure M any two adjacent inputs x and y are distinguishable from the output of M only with bounded probability. Formally we define $\epsilon$, $\delta$-differential privacy as follows. Definition 3: a randomized procedure M is $\epsilon$, $\delta$-differentially private for adjacent inputs x and y if, for all sets of outcomes S:

$$Pr[M(x) \in S] = e^\epsilon Pr[M(y) \in S] + \delta$$

A mechanism may turn any procedure into a $\epsilon$, $\delta$-differentially private mechanism by adding non-negative noise only. The main lemma may be restated as follows. Lemma 4. Consider the procedure $M(x)$ that adds noise $N' \sim [\max(0; \text{Laplace}(\mu, s)]$ to a value $x > 0$. Then M is $\epsilon$, $\delta$-differentially private with respect to changes of up to t in x, for parameters:

$$\epsilon = \frac{t}{s} \text{ and } \delta^- = \frac{1}{2} e^{(t-\mu)/s}$$

Differentially private queries are now discussed. Since our rewritten queries leak the frequency of the plaintexts, the $\epsilon$, $\delta$-differentially private mechanism is now discussed. Noise is added to the query values $c_{min}(v)$ and $c_{max}(v)$ before sending them to the server. It is important to restrict to including additional entries in the result set which can be filtered on the client and hence only positive noise can be added. Negative noise would require at least two queries which could be correlated by the attacker (e.g. by their timing).

We determine the parameters for the mechanism. First, since we aim to hide the frequency of the plaintexts, t is the difference between the maximum and minimum frequencies of any plaintext. Second, we can choose parameters $\mu$ and $\epsilon$ and compute the security parameter S.

Note that the order of the ciphertexts (j for $c_j$) are continuous integers from 0 to n−1 (inclusive). Hence, the noise can be rounded to the next largest integer. Any diluted ciphertext will then be also in the set of ciphertexts.

Note that it is desired to hide the frequency of v, i.e. the difference between $c_{min}$ and $c_{max}$, and not the limit values by themselves. Hence, it is needed to apply noise between both values. Furthermore, in order not to leak additional information by multiple queries the noise is computed using a pseudo-random function with fixed seed. Let $y=PRF1(x)$ be a pseudo-random function where $y \sim \max(0, \text{Laplace}(\mu; s))$. Let $y=PRF2(x)$ be a pseudo-random function where $y \sim \text{Uniform}(0; 1)$. The following are computed.

$$\tilde{c}_{min}(v) = c_{min}(v) - \lceil PRF2(v) \cdot PRF1(v) \rfloor$$

$$\tilde{c}_{max}(v) = c_{max}(v) + \lceil (1-PRF2(v)) \cdot PRF1(v) \rfloor$$

A query of type $x==v$ is then rewritten to $\tilde{C}_{min}(v) \leq x \leq \tilde{C}_{max}(v)$.

The noise needed to be added for a database may be estimated based on the maximum distance t of any two frequencies. If we set $\epsilon=0:5$ and $\mu=15 \cdot t$, we have $\delta < 2^{-10}$. Then the additional items to be retrieved will be between [0; [18:23·t]] with 90% probability.

Adjustable encryption is now described. Under a concept of adjustable encryption for database, the basic idea is that data is initially encrypted using probabilistic, IND-CPA secure encryption and only on demand decrypted (on the server) to a lower encryption scheme like deterministic or order-preserving encryption. In many aspects the SLFOPE scheme is more secure than deterministic encryption. It provably prevents frequency analysis attacks. However, it is not fully IND-CPA secure and an adjustment from IND-CPA secure encryption is not straightforward. Embodiments offer an adjustable encryption procedure that before adjustment fulfills a stronger, IND-CPA equivalent security model and offers simple adjustment with O(1) communication cost.

The security model is now described. Embodiments again aim at preventing an adversary that has onetime access to the database from learning anything, i.e. it is assumed that the adversary has access to the full database. Furthermore, as before it is assumed that the adversary cannot observe queries or inserts. However, we aim at the equivalent of a chosen plaintext attack and we make an even weaker assumption on the background knowledge of the adversary. Loosely speaking, the adversary may choose the plaintext for each database entry except the challenge ciphertext. We call our security model IND-SCPA—indistinguishability under static chosen plaintext attack.

Again, we first give a non-interactive, static version of our adjustable, order-preserving encryption scheme. This is then extended to a dynamic version. An adjustable, order-preserving encryption scheme $\Pi_{ADJ\text{-}SLF\text{-}OPE}$ comprises the following four procedures:

k←KeyGen($\lambda$): Generates a secret state k according to the security parameter $\lambda$.

$\bar{c}$ ←Encrypt($\mathbb{M}$, k): Computes the set of IND-SCPA secure ciphertexts $\bar{c}$ for the multi-set of plaintexts M.

C←Adjust($\bar{c}$, $k_{ADJ}$): Computes the set of IND-SCA secure ciphertexts $\mathbb{C}$ for the set of IND-SCPA secure ciphertexts using and adjustment key $k_{ADJ}$.

$m_i$←Decrypt($c_j$, k): Computes the plaintext $m_i \in \mathbb{M}$ M for ciphertext $c_j \in \bar{c}$ using key k.

We can now formulate our security model as a game between an adversary and a challenger. Our game Game$_{SCPA}$ ($\lambda$,n) for a static chosen plaintext attack proceeds as follows:

1. The challenger executes k←KeyGen($\lambda$) and stores the key.
2. The adversary chooses n−1 plaintexts $m_i \in \mathbb{D}$. Furthermore, the adversary chooses two plaintext $m^*_0$ and $m^*_1$. The adversary sends $m_0, \ldots, m_{n-2}, m^*_0, m^*_1$ to the challenger.
3. The challenger flips a coin B∈(0,1). Let $m_{n-1} = m^*_B$ be the n-th plaintext and M=($m_i$/0≤i<n) be set of all plaintexts. The challenger executes $\bar{c}$ ←Encrypt(M, k) and sends $m_i$, $c_j$(0≤i≤n−2) and $c_j^*$, such that $m_{n-1} = m^*_B$=Decrypt($c_j^*$, k) to the adversary.
4. The adversary outputs its guess $B_A$ of B.

We define security against a static chosen plaintext attack as follows. Definition 5: we say an order-preserving encryption scheme $\Pi_{ADJ\text{-}SLF\text{-}OPE}$ is IND-SCPA secure against static chosen plaintext attack if the adversary A's advantage of outputting a correct guess $B_A$=B is negligibly in $\lambda$, i.e.:

$$Pr[A(Game_{SCPA}(\lambda, n)) = \beta] < \frac{1}{2} + \frac{1}{poly(\lambda)}$$

A static adjustable encryption procedure is now discussed. The idea of our adjustable encryption procedure is as follows. Instead of storing the sequence 0, . . . , n−1 as order we store a binary, sorted tree. The tree defines a total order on the elements and hence the sequence can be deduced from it. In the tree structure ciphertexts can be stored in a random (also physical) order using pointers, yet searching and inserting new elements is efficient (O(log n)). Let m>>n and $p_i$ be a virtual identifier of the i-th plaintext. We can compute $p_i$ using the keyed pseudo-random function $p_i$=PRF3(i) where 0≤$p_i$<m. Our static adjustable order-preserving encryption scheme ADJ-SLF-OPE is then implemented as follows.

k←KeyGen($\lambda$): Execute K←RN D.KeyGen($\lambda$), $K_{ADJ}$←RN D.KeyGen($\lambda$), choose a key for the pseudorandom function PRF3 and uniformly choose 0≤r<n. Let k=(K, $K_{ADJ}$, PRF3, r).

$\bar{c}$ ←Encrypt(M, k): We compute the binary, sorted, balanced tree T from M. Let $l_i$ be the index of the left child of plaintext $m_i$ and $r_i$ be the index of the right child of plaintext $m_i$. The ciphertext is computed as $c_i$←(PRF3 (i), RN D.Encrypt($m_i$;K), RN D.Encrypt(PRF3($l_i$)/PRF3($r_i$), $K_{ADJ}$)).

C←Adjust(C, $k_{ADJ}$): Parse each ciphertext $c_j$ as ($p_j$, $C_j$, $T_j$). Compute $pt_j$; $pr_j$←Decrypt($T_j$). Reconstruct the tree, then from the tree the total order and compute the position j in the total order. Compute j'=j+r mod n. The adjusted ciphertext $c_j'$ is ($C_j'$, j').

$m_i$←Decrypt($c_j$, k): Parse each ciphertext $c_j$ as ($p_j$,$C_j$,$T_j$). Compute $m_i$←RND.Decrypt($C_j$, K).

A security proof is now provided. In order to prove security of the static adjustable encryption scheme, we follow the same strategy as for IND-SCA security. First, we give a simulator of the view of the adversary without input of the challenge plaintexts.

Lemma 8. Let $\mathbb{M}'=(m_0, \ldots, m_{n-2})$ be the set of chosen plaintexts without the challenge ciphertext. There exists a simulator S($\lambda$, $\mathbb{M}'$) outputting $\bar{\mathbb{C}}$, such that the adversary A's view $\mathbb{C}$ in game Game$_{SCPA}$ is computationally indistinguishable from $\bar{\mathbb{C}}$. As proof the simulator proceeds as follows. It executes k←KeyGen($\lambda$) and uniformly and independently chooses m from $\mathbb{D}$ (0≤i<n). It then computes $\bar{c}_j$←(PRF(j), Encrypt($m_j$,K), Encrypt(j+n/j+2n, $K_{ADJ}$)) (0≤j≤n−2). Finally, it computes and $\bar{c}_{n-1}$←(PRF(n−1), Encrypt(m, K), Encrypt(2n−⅓n−1, $K_{ADJ}$)). The two sets $\bar{\mathbb{C}}$ and $\mathbb{C}$ are computationally indistinguishable, since all ciphertexts are composed of a pseudo-random number and two IND-CCA secure ciphertexts in both cases.

Then we prove structural independence of the encryption as follows. Lemma 9. Plaintext $m_{n-1}$ always has ciphertext $c_{n-1}$. As proof, this follows from the construction of the simulator in Lemma 8.

Theorem 10. Our static adjustable encryption algorithm $\Pi_{ADJ\text{-}SLF\text{-}OPE}$ is IND-SCPA secure. As proof, since the encryption is independent of the challenge plaintext (Lemma 8) and position of challenge ciphertext $c_{n-1}$ is independent of all plaintexts (Lemma 9), the adversary cannot succeed in game Game$_{SCPA}$ with probability ½+1/poly($\lambda$) (sum of guessing the challenge plaintext and the probability of the breaking the computational indistinguishability).

A dynamic adjustable encryption procedure is now described. In order to turn our static adjustable encryption procedure into a dynamic one we replace the tree T with a self-balancing, binary tree, e.g. a red-black tree. The advantage of a self-balancing tree is that search and insert operations remain efficient.

On the server we store a map of the virtual addresses $p_j$ and the ciphertexts $c_j$. Each ciphertext $c_j$ corresponds to one node in the (self-balancing) tree. We access each node by the operations Get($p_j$) for retrieving a node, Update($c'_j$) for replacing a ciphertext $c_j$ with $c'_j$ at virtual address $p_j$, and Insert($c_j$) for inserting a new ciphertext $c_j$. We run this procedure on the client as part of the dynamic encryption procedure. Each access to a tree node is replaced by one of the operations above. Of course, each node is decrypted after retrieval and encrypted before update. Our dynamic encryption procedure then proceeds as follows:

$c_{n-1}$←Encrypt($m_{n-1}$, k): Prepare an initial ciphertext c'←(PRF3(n−1), RN D.Encrypt($m_{n-1}$, K), RND.Encrypt(−1/−1, $K_{ADJ}$)). Insert $c'_i$ into the self-balancing tree by running the insert procedure on the client replacing all accesses to tree nodes by calls to the server.

It is easy to see that a static adversary will see the same view as in the static version of the protocol. Since the adversary's view in Game$_{SCPA}$ is static and does not include the access pattern during the encryption, all ciphertexts are indistinguishable. Each ciphertext is ordered by and addressed by the same virtual addresses and contains two additional IND-CCA secure ciphertexts. Hence, our dynamic adjustable encryption procedure is also IND-SCPA secure.

The examples just provided are given for purposes of illustration only, and embodiments are not limited to them. Thus while FIG. 1 shows the server engine as being separate from the database, this is not required.

In certain embodiments the server engine may be implemented by a database engine, for example as present in an in-memory database. One example of such an in-memory database engine is that of the HANA in-memory database available from SAP SE of Walldorf, Germany.

Figure 5:
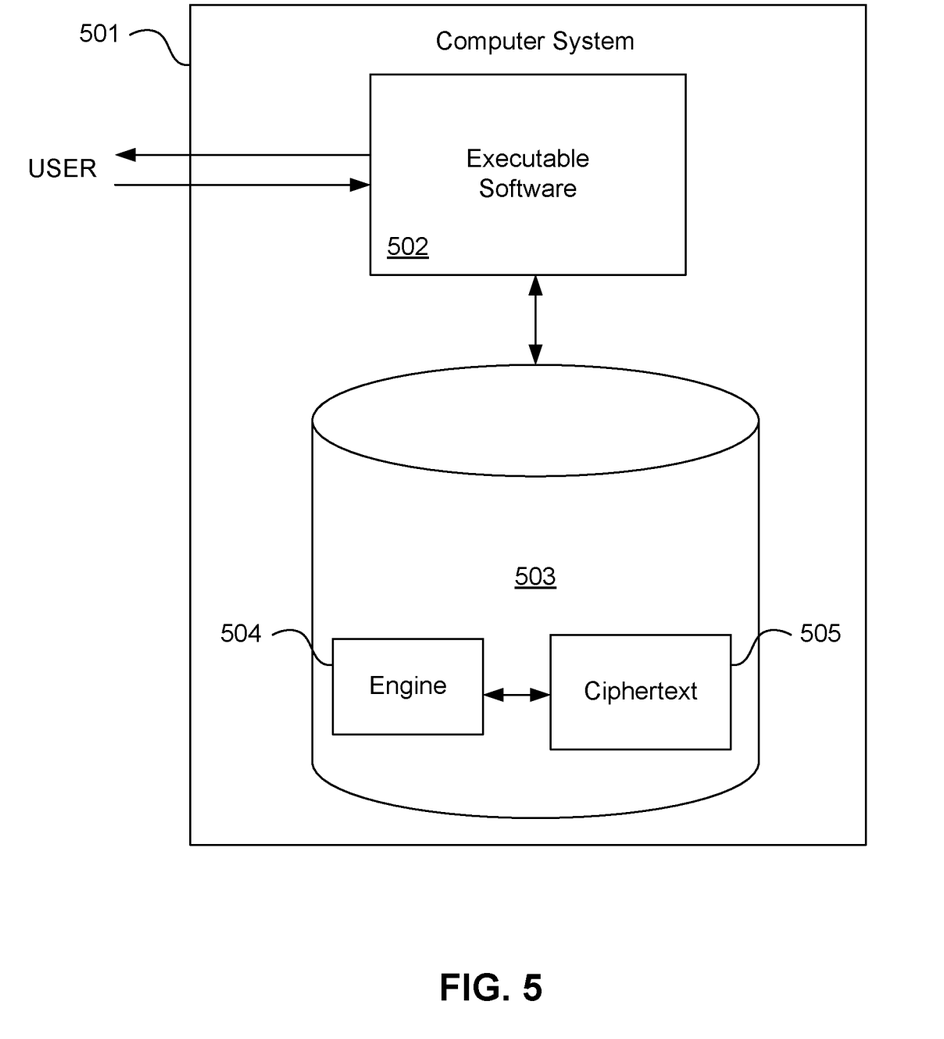
FIG. 5 illustrates hardware of a special purpose computing machine configured to implement static leakage-free order-preserving encryption according to an embodiment.

For example, FIG. 5 illustrates hardware of a special purpose computing machine configured to implement overlay visualization in a data layer according to an embodiment. In particular, computer system 501 comprises a processor 502 that is in electronic communication with a non-transitory computer-readable storage medium 503. This computer-readable storage medium has stored thereon code 505 corresponding to ciphertext. Code 504 corresponds to a server engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 6:
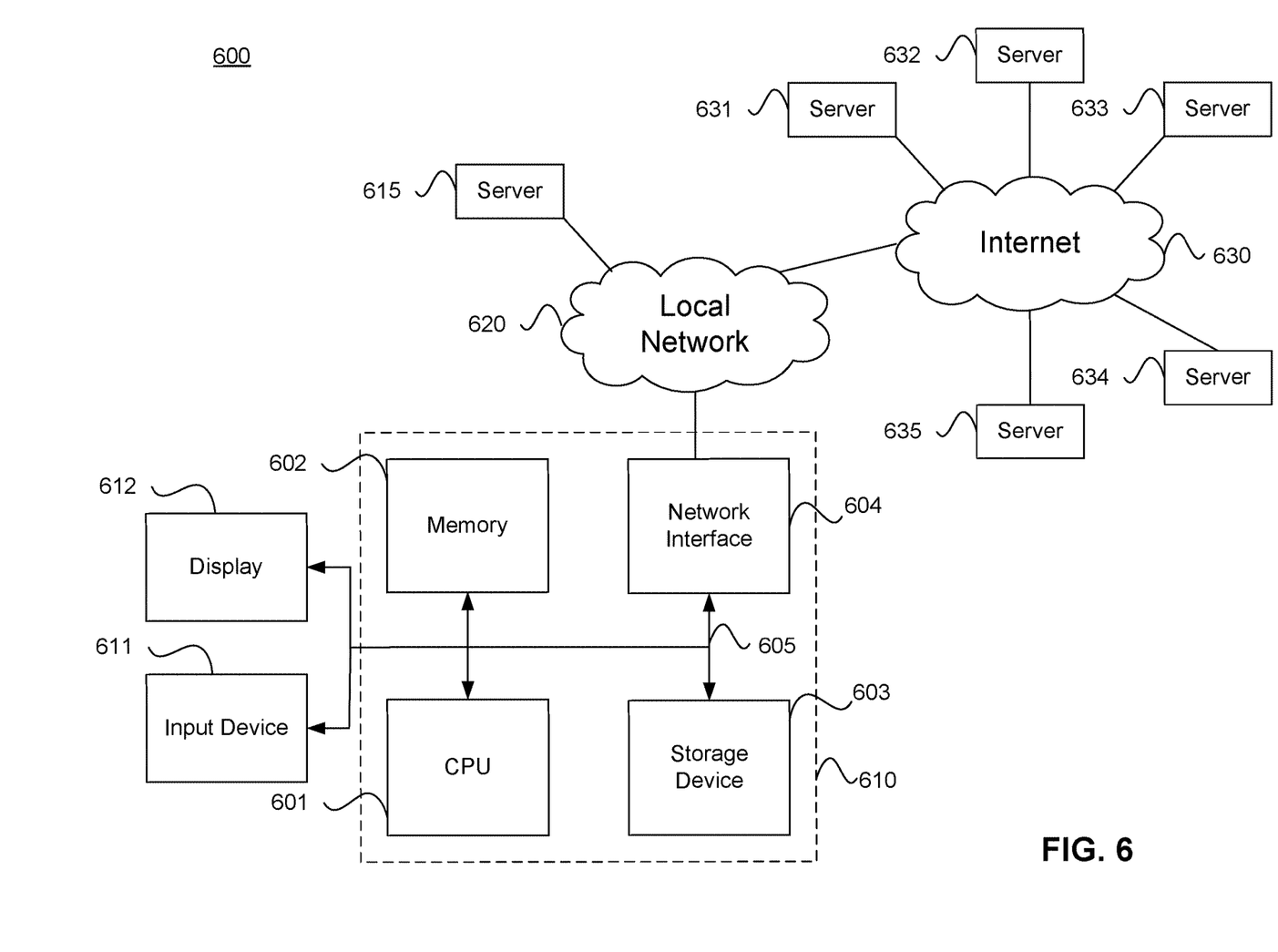
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
    a client encrypting plaintext into randomized ciphertext by inserting repeated plaintext elements at random locations, such that there are multiple ciphertexts for a single plaintext;
    the client converting the randomized ciphertext into a compressed ciphertext space according to a probabilistic encryption scheme;
    the client performing a rotation of the compressed ciphertext space about a modulus to create distributed ciphertext;
    the client encrypting the distributed ciphertext according an adjustable encryption scheme;
    the client forwarding the encrypted distributed ciphertext to a server;
    an in-memory database engine at the server storing the encrypted distributed ciphertext in an in-memory database of the server;
    the client rewriting an equality query into a range query;
    the client communicating the range query to the server;
    in response to the range query, the in-memory database engine,
        decrypting the encrypted distributed ciphertext to a searchable encryption scheme, and
        searching the decrypted distributed ciphertext in the searchable encryption scheme according to the range query using an index, to produce a range query result comprising a subset of the decrypted distributed ciphertext in the searchable encryption scheme;
    the client receiving from the server the range query result; and
    the client decrypting the range query result from the searchable encryption scheme.

2. A method as in claim 1 wherein the adjustable encryption scheme stores a binary tree.

3. A method as in claim 2 wherein the binary tree is self-balancing.

4. A method as in claim 1 wherein decrypting the range query result comprises updating the modulus based upon a further rotation performed at the server.

5. A method as in claim 1 further comprising applying a differential privacy procedure to generate the range query as a private query.

6. A method as in claim 5 wherein the differential privacy procedure utilizes a $\epsilon$, $\delta$-differentially private mechanism.

7. A non-transitory computer readable storage medium embodying a computer program for performing a method, said method comprising:

a client encrypting plaintext, into randomized ciphertext by inserting repeated plaintext elements at random locations, such that there are multiple ciphertexts for a single plaintext;

the client converting the randomized ciphertext into a compressed ciphertext space according to a probabilistic encryption scheme;

the client performing a rotation of the compressed ciphertext space about a modulus to create distributed ciphertext;

the client encrypting the distributed ciphertext according an adjustable encryption scheme;

the client communicating the encrypted distributed ciphertext to a server;

an in-memory database engine at the server storing the encrypted distributed ciphertext in an in-memory database of the server;

the client rewriting an equality query into a range query;

the client communicating the range query to the server;

in response to the range query, the in-memory database engine, decrypting the encrypted distributed ciphertext to a searchable encryption scheme, and searching the decrypted distributed ciphertext in the searchable encryption scheme according to the range query using an index, to produce a range query result comprising a subset of the decrypted distributed ciphertext in the searchable encryption scheme;

the client receiving from the server the range query result; and the client decrypting the range query result from the searchable encryption scheme.

8. A non-transitory computer readable storage medium as in claim 7 wherein the adjustable encryption scheme stores a binary tree.

9. A non-transitory computer readable storage medium as in claim 8 wherein the binary tree is self-balancing.

10. A non-transitory computer readable storage medium as in claim 7 wherein decrypting the range query result comprises updating the modulus based upon a further rotation performed at the server.

11. A non-transitory computer readable storage medium as in claim 7 wherein the method further comprises applying a differential privacy procedure to generate the range query as a private query.

12. A non-transitory computer readable storage medium as in claim 11 wherein the differential privacy procedure utilizes a $\epsilon$, $\delta$-differentially private mechanism.

* * * * *